Patented Dec. 21, 1948

2,457,036

UNITED STATES PATENT OFFICE 2,457,036

COFFEE CONCENTRATE AND THE PROCESS OF PRODUCING IT

Albert A. Epstein, New York, N. Y.

No Drawing. Application April 10, 1946,
Serial No. 661,077

7 Claims. (Cl. 99—71)

This invention relates to a novel and improved type of coffee concentrate and the process of producing it. "Coffee concentrates" are products containing the essence or active ingredients derived from the coffee bean in such form as to enable a cup of coffee to be quickly prepared therefrom merely by dissolving a measured amount of the concentrate in hot water, thus dispensing with brewing or percolating the coffee in order to produce the customary or desired beverage. The active ingredients, termed "coffee extractives," consist of the volatile aromatic and flavor components (caffeol) and the potency factor of the coffee (caffeine).

The use of coffee concentrates has been limited heretofore principally because of a number of inherent shortcomings in existing preparations, to wit: loss of volatile aromatic and flavor components resulting from exposure to air whenever the coffee extract container is opened; and absorption of atmospheric moisture because of the hygroscopicity of the coffee extract which causes deterioration of the coffee extract and promotes rancidity of the fatty constituents.

A general object of this invention is a water soluble coffee concentrate whose cup-coffee producing potency and flavor is fully preserved, and the possibility of deterioration from exposure to the air is reduced to a minimum.

A further general object is a water soluble concentrate containing the coffee extractives in a form and in a manner so that they will not be chemically altered in time or upon exposure.

A further object of the invention is the preparation of a coffee concentrate the essential principles of which are completely sealed in, thus protecting them from loss of potency, aroma, volatilization and chemical change due to atmospheric action; this being accomplished by means of a water soluble comestible base, with which the coffee extractives are homogeneously fused; and more particularly a comestible water soluble base, with a melting point below 100° C.

A further object of the invention is a coffee concentrate in solid form which is readily soluble in water. An allied object is a vitrified coffee concentrate; a still further object is a non-hygroscopic solid vitrified coffee concentrate.

A further object of the invention is a solid coffee concentrate whose melting point is below 100° C., so that hot water will melt as well as dissolve the concentrate, and more particularly a coffee concentrate having the additional characteristic of a melting point, which is well above room temperature so that the coffee concentrate may be kept and stored at ordinary temperatures.

The attainment of the foregoing and other objects of the invention which will appear or be pointed out herein, evolved from the novel concepts of sealing-in the coffee extractives by fusing them into a molten comestible base and of employing for that purpose a comestible base which will cause the resulting fused volume to solidify into a vitrified mass.

For the effective attainment of my objects, I employ as the comestible base, that member of the group of six-hydroxyl carbohydrates known as sorbitol. Sorbitol has the following general characteristics: it has no odor of its own and is practically tasteless; its melting point of 93° C. is relatively low; it vitrifies upon cooling, vitrification occurring quickly upon drop in temperature; it is water soluble; its melting point is below its caramelization point; in its solid or vitrified form, it is non-hygroscopic.

Sorbitol possesses other characteristics of special significance where used as a base for fusing coffee extractives therein. Among these are: its capability in molten state to dissolve or fuse an amount of coffee extractives several times, by weight, that of the base itself, this amount of extractives fusing homogeneously throughout the base without residue or trace of the extractives in their original powdered form; it vitrifies upon cooling, even when containing this large amount of fused coffee extractives; it retains its characteristic of rapid vitrification without caramelization even with this large content of fused extractive; by reason of its relatively low melting point of 93° C. and prompt fusion with the extractives, a product is obtained without destroying or diminishing the characteristics of the coffee extractives such as loss of the volatile aromatic and flavor components and impairment of potency; it does not react chemically with the coffee extractives when in molten or solid state; it introduces no odor and does not affect the taste of the original coffee extractives.

The resulting coffee concentrate comprising a sorbitol base in which is fused an amount of coffee extractives several times, by weight, that of the sorbitol itself has the following characteristics: its melting point is slightly lower than that of sorbitol, the reduced melting temperature varying with a variation in the proportioning by weight, of the extractives and the sorbitol; the molten concentrate is not directly converted into vitrified form as the temperature is lowered, but solidifies gradually with the progressive lowering of the temperature until it reaches the temperature at which it vitrifies and this vitrifying temperature also varies somewhat with variations in the proportioning by weight of the extractives to the sorbitol. Within this range of temperature between the melting point and the vitrification point, there is a narrower range of temperature at which the concentrate mass is sufficiently malleable so that it can be worked into units of predetermined shape and weight.

In its solid or vitrified form, the coffee concentrate has the following characteristics: it is water soluble; it is non-hygroscopic; its vitrification point is well above room temperature so that it may be kept and stored at ordinary temperatures; its melting point is below 100° C. so that it melts as well as dissolves in hot water.

The process which I employ for preparing the novel and improved coffee concentrate of this invention will now be described by way of a few examples.

*First example.*—One pound (1 lb.) of sorbitol is heated to its melting point and while maintained in molten state at that temperature, three pounds (3 lbs.) of dry, powdered coffee extractives is introduced into the molten base into which it dissolves or fuses. Constant stirring, during and for a short period after introduction of the extract, hastens the fusion thereof and assures a uniform distribution of the extractives throughout the base. The temperature of the molten base containing the coffee extractives homogeneously fused therein is then lowered to a point where the mass becomes malleable or plastic. The mass while malleable can be shaped as desired or reduced to small units such as tablets of predetermined shape of sufficient size to make one cup of coffee, or into units of larger size which may be sectionalized and incised as by grooves or channels, into smaller sections each sufficient for a cup of coffee. These units are then cooled to their vitrification point to give a vitrified coffee concentrate of the character referred to.

In the carrying out of the process in the above example, it will be observed that the melting point of the sorbitol, 93° C., is sufficiently low that fusion of the coffee extractives is consummated at a temperature at which there will be no charring of the coffee extractives, volatilization of its aromatic flavor components, nor diminishment of its potency; nor will there be any caramelization of the sorbitol at this temperature. The effects of fusing the amount of coffee extractives specified in the above example are that the melting point is lowered to approximately 83° C. and that the vitrification point is lowered to approximately 63° C. The narrow temperature range of malleability referred to in the above example is within the wider temperature range between 83° C. and 63° C.

The temperature range of malleability and the vitrification temperature of the concentrate are thus seen to be, on the one hand, even lower than the melting point of the sorbitol base at which fusion of the coffee extractives is carried out, and, on the other hand, sufficiently above room temperature so that the coffee concentrate may be kept at ordinary temperatures without softening.

*Second example.*—The proportion of sorbitol base and coffee extractives may be varied from that given above. In this second example, one pound (1 lb.) of sorbitol and two pounds (2 lbs.) of coffee extractives are used. The steps herein are the same as those described above, the two examples differing only in the following respects: By reason of the smaller proportion of coffee extractives present, the melting point of the concentrate and its vitrification point will be lowered to lesser extents, specifically, to approximately 85° C. and 67° C., respectively, the narrower temperature range of malleability being within these two. Hence working of the malleable mass and vitrification will be effected at temperatures somewhat higher than in the first example. Because of the smaller proportion of coffee extractives, the size of the individual tablets and sectionalized units of the composite bar will be somewhat larger to provide the same required amount of extractives.

*Third example.*—In this example, the temperature of the molten sorbitol base containing the fused coffee extractives (and prepared as described in the foregoing examples) is lowered, not to the range of malleability as in the first two examples, but to the vitrification point, so that the molten volume is vitrified into a single mass of any preferred or desired shape such as that of the containing vessel or convenient for commercial use.

The vitrified mass, or a portion thereof, may then or subsequently be further processed for conversion into smaller units in marketable form by heating it to the range of malleability (referred to in the first two examples) and reducing the mass while malleable into smaller units of predetermined shape and size.

The novel and improved coffee concentrate of this invention admirably meets all the requirements for such a product and overcomes the shortcomings (some of which have been pointed out in the statement of invention) of coffee concentrates heretofore marketed. It can be prepared in convenient form, size and shape for market for preparing cup-coffee with ease and it will retain its original fresh condition for long periods of time even after repeated exposure to the atmosphere. Storage and repeated or continued exposure will not cause any diminishment of potency, loss of volatile aromatic and flavor components of the coffee extractives, rancidity or other deterioration; it is non-hygroscopic.

I claim:

1. A water soluble coffee concentrate in the form of a vitrified non-hygroscopic mass comprising extractives derived from coffee beans and a carbohydrate base which vitrifies upon cooling from the molten state, said coffee extract being homogeneously fused into the said vitrified carbohydrate to seal-in the volatile aromatic and flavor components and potency factor thereof, said carbohydrate base having a melting point under 100° C. whereby the coffee extractives are taken up by the fused base without charring or loss of volatile components and whereby the solubility of the concentrate is enhanced by melting thereof.

2. The coffee concentrate according to claim 1 wherein the said carbohydrate base is sorbitol.

3. The coffee concentrate according to claim 2 wherein the weight of coffee extractives is at least twice that of sorbitol.

4. The coffee concentrate according to claim 1 having melting and solidification points approximately between 85° C. and 60° C., respectively, whereby the concentrate becomes malleable within a temperature range considerably above room temperature and may be predeterminedly shaped, said shape being retained at room temperature.

5. The coffee concentrate according to claim 1 wherein the weight of coffee extractives is at least twice that of carbohydrate base.

6. The process of producing a non-hygroscopic water soluble coffee concentrate in the form of a solid mass comprising the steps of melting sorbitol, fusing therein extractives derived from coffee beans, and cooling the said molten sorbitol to form a vitrified mass homogeneously containing the coffee extractives.

7. The process of producing a non-hygroscopic water soluble coffee concentrate comprising the steps of melting sorbitol, introducing into the molten sorbitol an amount of coffee extractives at least twice the weight of the sorbitol, and cooling the molten sorbitol to form a vitrified mass homogeneously containing the said weight of coffee extractives.

ALBERT A. EPSTEIN.

REFERENCES CITED

The following references are of record in the file of this patent:

UNITED STATES PATENTS

| Number | Name | Date |
|---|---|---|
| 1,367,715 | Pratt et al. | Feb. 8, 1921 |
| 1,866,415 | Lorand | July 5, 1932 |
| 1,951,357 | Hall | Mar. 20, 1934 |
| 2,324,526 | Morgenthaler | July 20, 1943 |

FOREIGN PATENTS

| Number | Country | Date |
|---|---|---|
| 7,904 | Great Britain | Feb. 20, 1897 |
| 16,178 | Great Britain | Nov. 13, 1913 |

OTHER REFERENCES

McIntosh, "Technology of Sugar," 3rd edition, page 448, Scott Greenwood and Son, London 1916.

Geerligs, "Cane Sugar and Its Manufacture," 2nd edition, pages 18-19, Norman Rodger, London 1924.